United States Patent Office 3,379,499
Patented Apr. 23, 1968

3,379,499
PRODUCTION OF ATTRITION RESISTANT
ALUMINA PARTICLES
Reno W. Moehl, Evanston, Ill., assignor to Universal Oil Products Company, Des Plaines, Ill., a corporation of Delaware
No Drawing. Filed Dec. 19, 1963, Ser. No. 331,934
8 Claims. (Cl. 23—141)

ABSTRACT OF THE DISCLOSURE

Preparation of attrition resistant alumina particles by spray drying of amorphous alumina precipitate having a crystallite size of about 25–30 Angstroms to form alumina particles in the pseudoboehmite state, followed by calcination to complete crystallite formation.

---

This invention is directed to the preparation of attrition resistant subdivided alumina in order that it may be used as a base for a catalyst composite and withstand high circulation rates in moving bed or fluidized systems. More specifically the invention relates to forming finely divided alumina by a spray dryer or other equivalent means while the alumina is in a substantially amorphous condition and to obtain alumina particles in a "pseudoboehmite" state. Such state may be defined as one which is a variant hydrate of alumina, intermediate between amorphous alumina and boehmite, the latter being the alpha-alumina monohydrate ($Al_2O_3 \cdot H_2O$).

Alumina, either as the hydrate or the anhydrous form as aluminum oxide, is widely used in many chemical and petroleum industries. It has been employed in the petroleum industry as a catalyst for hydrocarbon conversion processes, as a support for catalytically active materials to be used in hydrocarbon conversion processes, and as a dehydrating agent. It is widely used in other chemical industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or compounded with other compounds to produce substances of desired properties.

The major use of the synthetically prepared alumina is as a catalyst base for various chemical and petroleum conversion processes and in such instances the alumina is normally prepared in the "gamma alumina" form, which is quite stable and suitable for impregnation with one or more activating agents. The most common methods for manufacturing alumina as a catalyst supporting material involves the precipitation of aluminum hydroxide from an acidic aluminum salt. For example, ammonium hydroxide is added to a water solution of aluminum chloride or aluminum nitrate and an amorphous aluminum floc is precipitated and grows in crystal size to the crystalline boehmite state upon subsequent washing and heating treatments or aging. For pelleted or pilled forms of the catalyst the rapid crystal growth may be a desirable result, but where the alumina is desired in a powder or microspherical form for use in a continuous fluidized system, and is prepared by spray drying or a spin disc type operation from an aqueous slurry of the alumina precipitate, then the material must have attrition resistance to withstand high circulation rates. The spray drying of a slurried boehmite form of alumina results in a poor strength of material. It appears that where the crystalline structure is substantially fixed at the time of the formation of the alumina into fine particles, then there is a white chalky nature to the calcined particles and rapid attrition to resulting finished catalyst when carried in a fluidized or moving bed system.

Conversely, it has now been found that where the spray drying is carried out with alumina which is not in a full crystalline state, as for example in the pseudoboehmite state, then the resulting alumina particles after calcination or other treating and aging steps, consistently results in satisfactory hard attrition resistance. It appears that the particles undergo a physical change subsequent to their formation and acquire crystallite growth and hardness at the same time.

At the present time, it appears that the literature recognizes the pseudoboehmite form of alumina as one which has a crystallite size of the order of 25 to 30 Angstroms, which is approximately half the usual laboratory prepared boehmite crystallite size of 55 to 60 Angstroms. Surface area for the pseudoboehmite will also be about twice that of boehmite and in the range of 300 to 350 square meters per gram. In X-ray diffractometer scanning of pseudoboehmite, it is found that there is a shift of certain peaks toward lower angles, due to less intensities from crystalline structure. In other words, the most intense peak from pseudoboehmite will shift say about 1° to 2° $2\theta$ as compared with boehmite, and the identification of such pseudoboehmite form made on this basis.

It is thus an object of the present invention to provide for the initial formation of alumina particles into a pseudoboehmite state whereby attrition resistance can be obtained.

It is also an object of the present invention to effect spray drying, or other communication step, of alumina under controlled conditions precluding rapid crystallite formation and to provide for the formation of the desired particles in any initial pseudoboehmite state whereby crystallite formation proceeds subsequent to the particle formation and results in hard attrition resistant particles.

Thus, the present invention broadly embodies a method for preparing subdivided attrition resistant particles of alumina in a manner which comprises, forming an aqueous alumina precipitate from an aluminum salt, comminuting an aqueous suspension of the alumina precipitate while in a substantially amorphous state and effecting the formation of subdivided alumina particles in a pseudoboehmite state, and subsequently calcining such particles at an elevated temperature completing crystallite formation and providing resulting attrition resistance.

A specific embodiment of the present invention embodies a method for preparing finely divided attrition resistant particles of alumina in a manner which comprises, precipitating a substantially amorphous alumina from an acidic salt of aluminum and effecting a controlled washing and partial purification thereof leaving residual acid ions of such salt, preparing an aqueous suspension of the precipitated alumina while it remains in a partially amorphous state with crystallite sizes not greater than an equivalent to a pseudoboehmite form, and effecting the spray drying of finely divided alumina particles into an initial pseudoboehmite state, and subsequently effecting the calcining thereof at an elevated temperature completing crystallite formation and a resulting attrition resistant alumina of the "gamma" or gibbsite form.

In actually preparing an improved attrition resistant alumina as a catalyst base for use in a fluidized or moving bed system, there are various modifications in the processing steps which may be followed to insure the formation of pseudoboehmite alumina particles. One particularly advantageous step resides in the controlled washing of the alumina precipitate prior to the formation thereof into an aqueous slurry which is comminuted into the desired subdivided particles. Prior washing operations have generally been carried out in multiple stages to insure the substantially complete removal of acid ions, as for example the chloride or nitrate ions which are in the alumina floc at the time of precipitating amorphous alumina from an aluminum chloride or an aluminum nitrate salt solution. A substantially complete removal of the ions has been found to cause relatively rapid crystal growth within the alumina such that boehmite state is attained in a short period of time by aging or by heating. Conversely, the present improved operation for providing attrition resistance effects a controlled washing where residual acid ions, depending upon the salt from which the material is prepared, remain in combination with the alumina at the time of preparing a slurry feed for spray drying. The amount of acid ion may vary from about 0.20 to about 0.30 percent of the hydrogel, depending upon the time involved between the formation of the alumina precipitate and the initiation of the actual comminuting operation. In other words, where the manufacturing steps are carried out in a sequential manner leading to the spray drying operation within but a matter of a few hours after the alumina floc formation and washing steps, then there may be a relatively low percentage of acid ion left in the slurry as it is fed to the spray drying equipment. However, on the other hand, where the time period between alumina precipitation step and the spray drying step is lengthened and becomes greater than about 10 or 12 hours, then the acid ion content is preferably in the range of about 0.3 percent of the amorphous alumina precipitate at the time of preparing such precipitate as an aqueous slurry for the comminution step.

Another advantageous procedure for controlling crystallite formation of the amorphous alumina precipitate resides in the regulation of temperature during the washing steps as well as during the precipitation of the alumina floc from the aluminum salt by the ammonium hydroxide solution. In other words, the precipitation step may be carried out at a temperature below the normal room temperature, and down to the order of about 40° F., so as to reduce the tendency for crystal growth in the alumina hydrogel. Subsequently, instead of effecting the usual six or seven washing stages, for the purification and elimination of acid ions from the precipitate, that are carried out at slightly elevated temperatures of about 100° F., there may be a stirring and washing of the precipitate in each of the successive washing stages at a temperature equivalent to about room temperature or at a lower temperature down to the order of approximately 40° F., to likewise reduce the tendency for crystallite growth in the alumina hydrogel.

The separate controlled steps with respect to leaving residual acid ions in the slurry and temperature control during precipitation and/or during the washing stages may be utilized independently or in combination with one another to in turn provide the desired pseudoboehmite state for the alumina charge for slurrying and spray drying, whereby the desired attrition resistance is attained in the final carrier material or finished catalyst, subsequent to impregnation and calcination.

The following examples are provided to illustrate the invention but are not given for the purpose of unduly limiting the generally broad scope of the invention.

EXAMPLE I

An alumina gel precipitate was prepared by room temperature precipitation of aluminum chloride with ammonium hydroxide being added to provide a pH of about 8.1. The filtered precipitate was washed six times by separate stirrings and filterings in six successive steps with weakly ammoniated room temperature water. The chlorine content within the filter cake of alumina after the six washings was found to be 0.01 percent by weight. The total volatile matter was measured as 92.0% by weight of the undried filter cake alumina precipitate. An X-ray study of a sample of the dried alumina hydrate indicated that of the portion thereof measurable by an X-ray diffractometer approximately 50 percent of the crystallite sizes were of the larger bayerite form and approximately 50% of the boehmite form.

The alumina hydrogel, after the washings and filterings was subjected to slurrying in water to provide a spray drying formation of microspheres in a pilot plant sized (5 ft. diameter) spray drier. The latter utilizes heated, approximately 1000° F., air introduced co-currently with the charge. The air leaves the spray drier at about 300° F. to 350° F. such that the heat absorbed by these particles is dissipated in the evaporation of entrained water content and there is no change in the crystallite structure of the particles. The resulting collected spray dried microspheres were subsequently calcined at approximately 1500° F. and then subjected to nickel impregnation. In the impregnation step, the microspheres of alumina were contacted with a nickel nitrate solution in a manner to provide a resulting nickel content of approximately 20%, by weight of the composite after drying and calcining at approximately 1700° F. for a two hour period.

In order to determine the hardness of the particles and their resistance to attrition when used under fluidized operating conditions, a portion of the particles were subjected to a standard 42-hour attrition test. The apparatus for the attrition test embodies an approximately 27" long by 1½" I.D. lower tube with a perforated disc at the bottom, an enlarged upper 22" long by 5" I.D. chamber, and an overhead fines collecting flask. An air jet stream, with a velocity of about 890 ft./sec., passes up through a 45 gram catalyst sample in the lower tube and effects fluidization and attrition of the catalyst particles as they collide with each other. The weight percent recovery of fines collected in the overhead flask at the end of 12 hours of operation is determined as one measure for comparison purposes. Also, the average hourly rate of fines production for the next 30 hours (from 12 to 42 hours) is calculated to provide another evaluation guide.

The nickel impregnated catalyst of the present example, when subjected to the aforedescribed 42 hour attrition test provided an initial fines loss of 12.4% by weight at the end of the first 12 hours of attrition testing, and an average hourly rate of fines production equal to 0.12% for the 12 hours to 42 hour period.

EXAMPLE II

In another instance, an alumina gel precipitate was prepared by room temperature precipitation of aluminum chloride with ammonium hydroxide in a manner similar to that set forth in the aforedescribed Example I. However, the precipitate in this case was subjected to only three separate stirrings and washings with water to effect purification and partial removal of chloride ions from the alumina hydrogel. The alumina hydrogel filter cake material, after the three separate washings, was found to have 93.2% volatile matter and 0.26% chlorine. An X-ray study of a sample of the dried alumina filter cake indicated that the alumina was of a type having a small crystallite size of approximately 24 Angstroms and in the pseudoboehmite state.

The catalyst of this example was subjected to nickel nitrate impregnation and calcination in accordance with the steps of Example I to provide a resulting catalyst of approximately 20% nickel content by weight of the composite. The finished catalyst was also subjected to a 42-hour attrition test providing results showing an initial fines loss after 12 hours of 4.5% and an average hourly rate of fines production for the 12 to 42-hour period of 0.05%.

It will be noted, upon comparing the attrition rates for this latter catalyst with the catalyst of Example I, that in each instance the attrition was only about one-third (⅓) that of the catalyst of Example I. In other words it appears that the increased chlorine content in the alumina hydrogel as prepared for charge to the spray drier effected a retardation of the crystallite growth and was sufficient to maintain the alumina in the pseudoboehmite form at the time of spray drying whereby subsequent calcining or heating and aging permitted completion of crystal growth to the gamma form of alumina and to a desired resulting hardness from the spray drying production.

EXAMPLE III

In this example, an alumina gel precipitate was prepared from an aluminum chloride solution in a manner similar to that set forth in the previous examples. Again, the hydrogel precipitate was subjected to a plurality of washing and filtering steps with ammoniacal water to effect a partial removal of the chlorine ion therefrom. The washed alumina hydrogel was then slurried with water for charge to the spray drier, in the manner heretofore described in the other examples, to provide resulting finely divided microspheres suitable for a catalyst base after calcining. An X-ray diffractometer study of the microspheres, made prior to calcination, showed that such spheres were in the pseudoboehmite state having a small crystallite size of approximately 26 Angstroms. Also, analysis of the spheres showed volatile matter to be 70.5% by weight thereof. The microspheres were subsequently impregnated with a nickel nitrate solution to provide a resulting composite having approximately 10% nickel, by weight thereof, after washing and calcining at 1550° F.

Finished catalyst upon being subjected to the 42-hour attrition test provided results showing an initial fines loss after 12 hours of 4.6% and an average hourly rate of fines production for the 12 to 42-hour period of 0.09%.

EXAMPLE IV

In this example, a commercially obtained finely divided alumina material, generally referred to as Alcoa C-31 alumina, was utilized as a catalyst base for nickel impregnation. An X-ray study of the C-31 particles indicated that the material was primarily of the gibbsite form ($Al_2O_3 \cdot 3H_2O$) with large crystallite sizes.

The material was subsequently calcined and impregnated with a nickel nitrate solution to provide 11.6% weight nickel by weight of the washed, dried and calcined finished product. Here again, the finished catalyst was subjected to a 42-hour attrition test providing results showing an initial fines loss after 12 hours of 28% and an average hourly rate of fines production for the 12 to 42-hour period of 0.86%.

Here again, it may be noted that the alumina in the pseudoboehmite state at the time of comminution provided a resulting hard attrition resistant catalyst, while in comparison, the catalyst particles prepared from the C-31 (gibbsite alumina) had no satisfactory hardness or attrition resistance for use in a fluidized operation since the fines losses were greater than that permissible for an acceptable continuously operating unit.

By way of summary, it should be pointed out that it is found to be of obvious advantage in obtaining attrition resistance of the all-alumina particles, to effect the spray drying or other comminution to provide microsphere or particle formation in the pseudoboehmite state. In other words, it is recognized that time, acid ion content of the hydrogel for the spray dried feed, pH and temperature of precipitation and/or of precipitate washings, can independently or collectively result in factors affecting crystallite growth of the hydrogel; however, the control of one or more of such factors to obtain the desired state of hydration may suffice. It should be further noted that spray drying operations may vary, and that high temperature drying may vary the state of the alumina in the drier equipment; however, in the operations of the foregoing examples, with drying air entering at about 1000° F. and being discharged at about 350° F., there was no significant effect on the alumina as such. It appeared to remain in a pseudoboehmite state in the formed microspheres where it entered the dryer in the charge stream in such state.

I claim as my invention:

1. A method for preparing subdivided attrition resistant particles of alumina which comprises, comminuting an aqueous suspension of a predominantly amorphous alumina precipitate while maintaining the alumina in the amorphous state with crystallite sizes of the order of 25 to 30 Angstroms, and subsequently calcining such particles to complete crystallite formation and resulting attrition resistance.

2. A method for preparing finely divided attrition resistant particles of alumina which comprises, precipitating a substantially amorphous alumina from an acidic salt of aluminum and effecting a washing and partial purification thereof controlled to leave from about 0.20 to about 0.30 percent of residual acid ions of such salt in the alumina hydrogel, preparing a comminution feed as an aqueous suspension of the precipitated alumina while it remains in an amorphous state with crystallite sizes of the order of 25 to 30 Angstroms, effecting the formation of finely divided alumina particles from such feed, and subsequently calcining the particles to complete crystallite formation and to result in an attrition resistant alumina of the gibbsite form.

3. The method of claim 2 further characterized in that a slurry of the alumina precipitate is spray dried into finely divided microspherical particles while retaining the particles in a pseudoboehmite state.

4. The method of claim 2 further characterized in that the amorphous alumina is precipitated from an aluminum chloride solution by the addition of an ammonium hydroxide solution whereby said residual acid ions are chlorine ions which retard crystal growth in the alumina and retain it in a pseudoboehmite state at the time of comminution of the desired finely divided particles.

5. A method for preparing finely divided attrition resistant particles of alumina which comprises, precipitating a substantially amorphous alumina from an acidic salt of aluminum and effecting a washing and partial purification thereof at a temperature of from about 40° F. to about room temperature whereby at least about 50 percent of the alumina hydrogel has a crystallite size of the order of 25 to 30 Angstroms, effecting the spray drying formation of finely divided alumina particles from a slurry feed of said alumina of controlled crystallite size while retaining the particles in the pseudoboehmite state, and subsequently effecting the calcination of the spray dried particles to complete crystallite formation to the gibbsite state and resulting attrition resistance.

6. The method of claim 2 further characterized in that said acidic salt is aluminum chloride or aluminum nitrate.

7. The method of claim 5 further characterized in that said acidic salt is aluminum chloride and the amorphous alumina is precipitated therefrom with ammonium hydroxide.

8. The method of claim 1 further characterized in that said aqueous suspension is comminuted by spray drying.

References Cited

UNITED STATES PATENTS

| | | | |
|---|---|---|---|
| 2,893,900 | 7/1959 | Hemminger | 23—143 X |
| 2,970,966 | 2/1961 | Hoekstra | 23—143 X |
| 2,973,245 | 2/1961 | Teter et al. | 23—143 |
| 3,086,845 | 4/1963 | Malley et al. | 23—143 |
| 3,264,061 | 8/1966 | Kehl et al. | 23—141 |

OSCAR R. VERTIZ, *Primary Examiner.*

HERBERT T. CARTER, *Examiner.*